United States Patent [19]
Brenke et al.

[11] Patent Number: 5,993,911
[45] Date of Patent: Nov. 30, 1999

[54] AQUEOUS COATING COMPOSITIONS USING POLYALKYLENE GLYCOL DIALKYL ETHERS AND PROCESS FOR MULTI-LAYER LACQUER COATING

[75] Inventors: Stephan Brenke; Volker Duecoffre, both of Wuppertal; Klaus-Peter Doebler, Radevormwald; Frank Lieverz, Wuppertal; Walter Schubert, Wuppertal; Klaus Tännert, Wuppertal, all of Germany

[73] Assignee: Herberts GmbH, Wuppertal, Germany

[21] Appl. No.: 09/000,426

[22] PCT Filed: Jul. 30, 1996

[86] PCT No.: PCT/EP96/03348

§ 371 Date: Feb. 3, 1998

§ 102(e) Date: Feb. 3, 1998

[87] PCT Pub. No.: WO97/06219

PCT Pub. Date: Feb. 20, 1997

[30] Foreign Application Priority Data

Aug. 5, 1995 [DE] Germany ............... 195 28 878

[51] Int. Cl.$^6$ ............... B05D 1/36; B05D 1/38; C08J 3/03
[52] U.S. Cl. ............. 427/407.1; 427/409; 427/388.4; 524/501; 524/502; 524/504; 524/507; 524/508; 524/591; 524/839; 523/501
[58] Field of Search ............... 427/409, 388.4, 427/385.5, 407.1; 524/501, 502, 504, 507, 508, 544, 590, 591, 596, 598, 60, 876, 879, 538, 539, 839; 528/48, 66, 77; 523/501, 401; 200/DIG. 45

[56] References Cited

U.S. PATENT DOCUMENTS

| | | |
|---|---|---|
| 3,674,731 | 7/1972 | Guldenpfennig ............... 525/7 |
| 3,864,324 | 2/1975 | Yukuta et al. ............... 525/361 |
| 3,886,124 | 5/1975 | Wilson ............... 528/73 |
| 3,932,342 | 1/1976 | Nagata et al. ............... 524/441 |
| 4,107,238 | 8/1978 | Roper et al. ............... 525/250 |
| 4,146,736 | 3/1979 | Scheffel et al. ............... 568/607 |
| 4,315,053 | 2/1982 | Poth et al. ............... 427/409 |
| 4,322,325 | 3/1982 | Esser et al. ............... 523/457 |
| 4,795,787 | 1/1989 | Walz ............... 525/328.2 |
| 5,015,688 | 5/1991 | Bederke et al. ............... 524/600 |
| 5,075,372 | 12/1991 | Hille et al. ............... 524/839 |
| 5,102,966 | 4/1992 | Higashimura et al. ............... 526/209 |
| 5,159,024 | 10/1992 | Brindopke et al. ............... 525/301 |
| 5,275,847 | 1/1994 | Schwarte et al. ............... 427/407.1 |
| 5,430,107 | 7/1995 | Bederke et al. ............... 525/300 |
| 5,876,802 | 3/1999 | Brunnemann et al. ............... 427/409 |

FOREIGN PATENT DOCUMENTS

| | | |
|---|---|---|
| 2100493 | 1/1994 | Canada . |
| 0 051 483 | 5/1982 | European Pat. Off. . |
| 0 368 499 | 5/1990 | European Pat. Off. . |
| 0 391 271 | 10/1990 | European Pat. Off. . |
| 35 37 855 | 5/1987 | Germany . |
| 57-070120 | 4/1982 | Japan . |
| 158555 | 7/1969 | United Kingdom . |
| WO 90/03229 | 4/1990 | WIPO . |
| WO 95/31510 | 11/1995 | WIPO . |

*Primary Examiner*—Diana Dudash
*Attorney, Agent, or Firm*—Pillsbury Madison & Sutro LLP

[57] ABSTRACT

Aqueous coating compositions suitable for multi-layer lacquer coatings which contain binders based on water-dilutable polyol compounds in the form of hydroxy-functional poly(meth)acrylates, polyurethanes, polyethers, polyesters and/or polyester-modified poly(meth)acrylates together with crosslinking agents based on aminoplastic resins, phenolic resins, free and/or capped polyisocyanates prepared using poly($C_2$–$C_3$)alkylene glycol di($C_1$–$C_4$)alkyl ethers.

14 Claims, No Drawings

AQUEOUS COATING COMPOSITIONS USING POLYALKYLENE GLYCOL DIALKYL ETHERS AND PROCESS FOR MULTI-LAYER LACQUER COATING

This application is the national phase of international application PCT/EP96/03348 filed Jul. 30, 1996 which designated the U.S.

This invention relates to a heat curable aqueous coating composition which is in particular suitable for the production of lacquer coatings, in particular for multi-layer lacquer coatings, for example as an aqueous surfacer, water-borne base lacquer and preferably as a water-borne clear or topcoat lacquer.

Aqueous lacquers, in particular clear lacquers are described in the literature. DE-A-28 06 497 describes a multi-layer lacquer coating with a clear lacquer coating as the topcoat, wherein this clear lacquer is also intended to be water-borne. Water-borne clear lacquers are, however, not defined. The base lacquer coating composition which is used comprises elevated molecular weight, high viscosity polyesters dissolved in xylene which are mixed with acrylic resins. Such lacquers require large quantities of neutralising agents. DE-A-35 32 617 describes aqueous coating compounds based on high performance resins, for example polyester resins, in which resin particles, which may be acrylic resins, are dispersed. The compounds obtained are unstable and are subject to rapid phase separation.

DE-A-35 37 855 describes the used of acidic polycondensation products based on acrylic resins and polyether polyols which, once neutralised, may be used as water-dilutable binders for the production of water-borne stoving surfacers, topcoat lacquers or clear lacquers. It has, however, been found that even after stoving these systems exhibit inadequate resistance to humidity and sulphuric acid.

EP-A-0 365 775 also describes acidic polyacrylates which, once neutralised and diluted, are used for the production of water-borne topcoat lacquers. Melamine resin is used as the crosslinking agent. These coating compositions have an unsatisfactory high solids value, i.e. they require an elevated content of organic solvents of the order of 27 g and above relative to 100 g of resin solids content (corresponding to a high solids value of 73 and below). DE-A-42 23 183 describes aqueous emulsions based on acrylic copolymers which are synthesised as a graft on one or more low molecular weight polyesters and are then crosslinked with a mixture of melamine resins and capped polyisocyanates. DE-A-38 32 826 describes a process for the production of a coating composition based on a water-dilutable polyacrylate resin and an aminoplastic resin. DE-A-39 10 829 describes a water soluble clear lacquer which is substantially composed of an oligoester acrylate resin and a melamine resin.

In practice, monoalkyl and dialkyl ethers of ethylene glycol, propylene glycol, diethylene glycol and dipropylene glycol have been used as solvents in aqueous lacquer systems. This is, however, associated with disadvantages. A strong tendency to sag and a pronounced tendency to pinholing at low film thicknesses must be accepted.

EP-A-0 051 483 describes epoxy dispersions which contain epoxy resins containing glycidyl groups, dihydric phenols and diglycidyl ethers of polyoxyalkylene glycols. Glycols or glycol ethers may be present as solvents.

The object of the invention is to provide an aqueous coating composition which is in particular suitable for chemical-resistant and non-yellowing coatings having very good topcoat lacquer qualities, a very slight tendency to sag and in particular very high resistance to pinholing, wherein the coating composition should have elevated storage stability. The coating composition should have an elevated processing solids content.

It has been found that this object may be achieved by the provision of an aqueous coating composition which contains poly($C_2$–$C_3$)alkylene glycol di($C_1$–$C_4$)alkyl ethers as the lacquer solvent. Such polyalkylene glycol dialkyl ethers are commercially available, for example polyethylene glycol di-n-butyl ether, a commercial product which is described, for example, in the company literature "Polyglycol BB 300" from Hoechst and has hitherto been used as an absorbent, for example for scrubbing exhaust air.

The present invention accordingly provides the use of poly($C_2$–$C_3$)alkylene glycol di($C_1$–$C_4$)alkyl ethers in aqueous coating compositions. The poly($C_2$–$C_3$)alkylene glycol di($C_1$–$C_4$)alkyl ethers are hereinafter referred to as "polyalkylene glycol dialkyl ethers".

The polyalkylene glycol dialkyl ethers usable according to the invention contain 3 to 10, preferably up to 6 units, which are derived from $C_2$ to $C_3$ alkylene glycols. The alkylene groups may be ethylene groups and/or propylene groups, wherein the propylene groups may be 1,3- and/or 1,2- or 2,3-propylene groups.

The ethylene and propylene groups may also be present as a mixture. It is important that the compounds used are dialkyl ethers, i.e. that no terminal free OH groups are present. The etherification alcohols are alcohols having 1 to 4 carbon atoms; the ethers may be etherified with the same alcohols or with different alcohols. $C_1$, i.e. methyl, ether and $C_4$, i.e. butyl, ether, in particular n-butyl ether are preferred. One preferred example is polyethylene glycol di-n-butyl ether, in particular having 3 to 6 units derived from ethylene glycol. The polyalkylene glycol dialkyl ethers used may be mixtures. Polyalkylene glycol dialkyl ethers, for example, di-n-butyl ether, having 3 or more ethylene glycol units may, for example, be present.

The polyalkylene glycol dialkyl ethers preferably usable according to the invention may be represented by the following general formula:

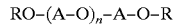

in which

R=$C_1$ to $C_4$ alkyl, wherein the residues R may be identical or different,

A=ethylene, 1,2-propylene or 2,3-propylene and/or 1,3-propylene, wherein the residues A may be identical or different, and n=an integer of 2 or more, preferably of up to 9, particularly preferably of up to 5.

The present invention also provides aqueous coating compositions which contain binders based on water-dilutable oligomeric or polymeric polyol compounds in the form of hydroxy-functional poly(meth)acrylates, polyurethanes, polyethers, polyesters and/or polyester-modified poly(meth)acrylates and crosslinking agents and which are characterised by a content of poly($C_2$–$C_3$)alkylene glycol di($C_1$–$C_4$)alkyl ethers. The content of polyalkylene glycol dialkyl ethers is preferably 1 to 20 wt. %, relative to the sum of polyol compounds, crosslinking agents and polyalkylene glycol dialkyl ethers.

The water-dilutable oligomeric or polymeric polyol compounds may, for example, be those having a hydroxyl value of 20 to 300 mg of KOH/g, in particular 50 to 300 mg of KOH/g, preferably 100 to 200 mg of KOH/g, an acid value of 0 to 100 mg of KOH/g, in particular of 0 to 50 mg of KOH/g, preferably of 10 to 35 mg of KOH/g. The number average molecular weight may be, for example, 500 to 10000, preferably 1000 to 5000. Preferred glass transition temperatures of the polyol compounds are −20 to +70° C., particularly preferably 0 to 50° C.

Crosslinking agents which may be used are, for example, conventional crosslinking agents, such as aminoplastic resins, phenolic resins and/or free and/or capped polyisocyanates. According to a preferred embodiment, the aqueous coating compositions according to the invention contain 40 to 90 wt. % of the polyol components (hereinafter referred to as component A)), 10 to 60 wt. % of one or more crosslinking agents (hereinafter referred to as component B)) and 1 to 20 wt. % of the polyalkylene glycol dialkyl ethers usable according to the invention (hereinafter referred to as component C)), wherein the sum of components A) to C) in each case adds up to 100 wt. %. The coating compositions additionally contain water, optionally together with one or more organic solvents and further conventional lacquer additives.

The polyols present as component A) in the coating compositions according to the invention are those based on hydroxy-functional (meth)acrylic copolymers, polyesters, polyester-modified (meth)acrylic copolymers, polyethers and/or polyurethanes. (Meth)acrylic should here be taken to mean acrylic and/or methacrylic.

The (meth)acrylic copolymers may be produced by polymerisation using conventional processes, such as for example bulk, solution or bead polymerisation. The various polymerisation processes are well known to the person skilled in the art and described, for example, in *Houben-Weyl, Methoden der organischen Chemie,* 4th edition, volume 14/1, pp. 24–255 (1961). The solution polymerisation process is preferred for the production of the (meth)acrylic copolymers used in the coating composition according to the invention. In this process, the solvent is introduced into the reaction vessel, heated to boiling temperature and a mixture of the monomers with the polymerisation initiators used for the polymerisation is continuously apportioned within a certain time. Polymerisation temperatures are between 60° C. and 160° C., preferably between 120° C. and 150° C.

The (meth)acrylic copolymers used may be non-functionalised, hydroxy-functionalised or carboxy-functionalised. Further differing ethylenically unsaturated monomers may moreover also be used.

Examples of non-functionalised (meth)acrylates are, for example, long-chain, branched or unbranched unsaturated monomers, such as alkyl (meth)acrylates having $C_8$–$C_{18}$ chains in the alkyl portion, such as for example 2-ethylhexyl (meth)acrylate, octyl (meth)acrylate, 3,5,5-trimethylhexyl (meth)acrylate, decyl (meth)acrylate, dodecyl (meth) acrylate, hexadecyl (meth)acrylate, octadecyl (meth) acrylate, 1214-lauryl acrylate, isobornyl (meth)acrylate, 4-tert.-butylcyclohexyl methacrylate. Further examples are short- or medium-chain, branched or unbranched unsaturated monomers, such as alkyl (meth)acrylates having $C_1$–$C_7$ chains in the alkyl portion, for example methyl (meth) acrylate, ethyl (meth)acrylate, propyl (meth)acrylate, butyl (meth)acrylate, isopropyl (meth)acrylate, isobutyl (meth) acrylate, tert.-butyl (meth)acrylate, pentyl (meth)acrylate, hexyl (meth)acrylate, cyclohexyl (meth)acrylate.

Further suitable non-functionalised polymerisable components are monovinyl aromatic compounds. They preferably contain 8 to 10 carbon atoms per molecule. Examples of suitable compounds are styrene and styrene derivatives, such as vinyltoluene, α-methylstyrene, chlorostyrene, o-, m- or p-methylstyrene, 2,5-dimethyl-styrene, p-methoxystyrene, p-tert.-butylstyrene, p-dimethylaminostyrene, p-acetamidostyrene and m-vinyl-phenol. Vinyltoluenes and in particular styrene are preferably used. It is also possible to use the vinyl ester of versatic acid (trade name VEOVA 10 from Shell AG).

Examples of further suitable non-functionalised ethylenically unsaturated monomers are the alkyl esters of maleic, fumaric, tetrahydrophthalic, crotonic, isocrotonic, vinylacetic and itaconic acid, such as for example the corresponding methyl, ethyl, propyl, butyl, isopropyl, isobutyl, pentyl, amyl, isoamyl, hexyl, cyclohexyl, 2-ethylhexyl, octyl, 3,5, 5-trimethylhexyl, decyl, dodecyl, hexadecyl, octadecyl and octadecenyl esters.

The (meth)acrylic monomers may bear primary or secondary hydroxyl functions. Examples of monomers having primary hydroxyl functions are hydroxyalkyl esters of α,β-unsaturated carboxylic acids, such as for example acrylic acid and/or methacrylic acid, having a $C_2$–$C_{18}$ hydroxyalkyl residue, such as hydroxyethyl (meth)acrylate, butanediol monoacrylate, hydroxyhexyl acrylate, hydroxyoctyl acrylate and the corresponding methacrylates and reaction products of hydroxyethyl (meth)acrylate with caprolactone.

Examples of monomers having secondary OH functions are hydroxypropyl (meth)acrylate, addition products prepared from glycidyl (meth)acrylate and saturated short-chain acids having $C_1$–$C_3$ alkyl residues, for example acetic acid or propionic acid, reaction products prepared from glycidyl (meth)acrylate with saturated branched or unbranched fatty acids having $C_4$–$C_{20}$ alkyl residues, for example butanoic acid, caproic acid, lauric acid, palmitic acid, stearic acid, arachidonic acid together with addition products prepared from glycidyl esters of highly branched monocarboxylic acids (the glycidyl ester of versatic acid is obtainable under the trade name Cardura E) with unsaturated COOH-functional compounds, such as for example acrylic or methacrylic acid, maleic acid, crotonic acid, addition products prepared from Cardura E with unsaturated anhydrides, such as for example maleic anhydride. The acrylic acid or methacrylic acid may be reacted with the glycidyl ester of a carboxylic acid having a tertiary α-carbon before, during or after the polymerisation reaction.

Examples of suitable monomers containing carboxyl groups are unsaturated carboxylic acids, such as for example acrylic, methacrylic, itaconic, crotonic, isocrotonic, aconitic, maleic and fumaric acid, semi-esters of maleic and fumaric acid together with β-carboxyethyl acrylate and addition products of acrylic acid and/or (meth)acrylic acid hydroxyalkyl esters with carboxylic anhydrides, such as for example phthalic acid mono-2-methacryloyloxyethyl ester, together with maleic anhydride semi-esters by addition of saturated aliphatic alcohols such as for example ethanol, propanol, butanol and/or isobutanol.

It is also possible to use a small quantity of (meth)acrylic monomers having terminal tert.-amino groups. Examples of such monomers are tert.-aminomethyl (meth)acrylate or tert.-aminomethyl (meth)acrylate.

Small proportions of monomers having at least two polymerisable, olefinically unsaturated double bonds may also be used. The proportion of these monomers is preferably below 5 wt. %, relative to the entire weight of the monomers. Examples of such compounds are hexanediol di(meth)acrylate, ethylene glycol di(meth)acrylate, butanediol di(meth)acrylate, hexamethylene bis(meth)-acrylate, trimethylolpropane tri(meth)acrylate and similar compounds.

Siloxane-modified monomers may also be used, such as for example trimethylsiloxylethyl (meth)acrylate and trimethyl-siloxypropyl (meth)acrylate.

Examples of polymerisation initiators which may be used are free-radical initiators, such as dialkyl peroxides such as di-tert.-butyl peroxide, dicumyl peroxide; diacyl peroxides, such as dibenzoyl peroxide, dilauroyl peroxide; hydroperoxides, such as cumene hydroperoxide, tert.-butyl hydroperoxide; peresters, such as tert.-butyl perbenzoate, tert.-butyl perpivalate, tert.-butyl per-3,5,5-trimethylhexanoate, tert.-butyl per-2-ethylhexanoate; peroxydicarbonates, such as di-2-ethylhexyl peroxydicarbonate, dicyclohexyl peroxydicarbonate; perketals, such as 1,1-bis-(tert.-butylperoxy)-3,5,5-trimethylcyclohexane, 2,2-bis-(tert.-butylperoxy) cyclohexane; ketone peroxides, such as cyclohexanone peroxide, methyl isobutyl ketone peroxide and azo compounds, such as 2,2'-azobis(2,4-dimethylvaleronitrile), 2,2'azobis(2-methylbutylvaleronitrile), 1,11-azobiscyclohexane-carbonitrile, azobisisobutyronitrile, together with C—C cleaving initiators, such as for example benzopinacole derivatives.

The polymerisation initiators are generally used, for example, in a quantity of 0.1 to 4 wt. %, relative to the initial weight of monomers. During polymerisation, the monomers may also be apportioned separately or at different times.

Polymerisation preferably proceeds in organic solvents. It is advantageous if at least a portion of this solvent mixture consists of poly($C_2$–$C_3$)alkylene glycol di($C_1$–$C_4$)alkyl ethers.

Chain-transfer agents may also be used to control molecular weight, especially in the preferred solution polymerisation. Examples of these are mercaptans, thioglycolic acid esters, chlorinated hydrocarbons, cumene, dimeric α-methylstyrene.

The described (meth)acrylic copolymers should preferably have a hydroxyl value of 50 to 300 mg of KOH/g, preferably of 100 to 200 mg of KOH/g, an acid value of 0 to 50 mg of KOH/g, preferably of 10 to 35 mg of KOH/g, a number average molecular weight (Mn) of 500 to 10000, preferably of 1000 to 5000, and a glass transition temperature of −20 to +70° C., preferably of 0 to 50° C.

Polyesters may also be used as binder component A). The polyesters present in the coating compositions according to the invention are produced using the conventional method familiar to the person skilled in the art of polycondensation of polycarboxylic acids, such as di- and/or tricarboxylic acids or the anhydrides thereof, optionally in the presence of monocarboxylic acids, di- and/or triols or more highly hydric polyols, optionally in the presence of monoalcohols. Production proceeds, for example, in a melt in the presence of conventional esterification catalysts and at elevated temperatures of, for example, 180–250° C. Entraining agents such as, for example, xylene may optionally also be used.

Monocarboxylic acids suitable for production of the polyesters are, for example, benzoic acid, tert.-butyl-benzoic acid, hexahydrobenzoic acid, saturated fatty acids, such as, for example, 2-ethylhexanoic acid, isononanoic acid, coconut oil fatty acid, hydrogenated technical fatty acids or fatty acid mixtures, decanoic acid, dodecanoic acid, tetradecanoic acid, stearic acid, palmitic acid, docosanoic acid, unsaturated fatty acids such as, for example, soya fatty acid, sorbic acid, peanut fatty acid, conjugated fatty acids, tall oil fatty acids, safflower oil fatty acid, together with mixtures of these or other monocarboxylic acids.

Suitable more highly functional carboxylic acids or anhydrides are, for example, phthalic acid, phthalic anhydride, isophthalic acid, terephthalic acid, tetrahydrophthalic acid, tetrahydrophthalic anhydride, hexahydrophthalic acid, hexahydrophthalic anhydride, 1,3- and 1,4-cyclohexanedicarboxylic acid, maleic acid, maleic anhydride, succinic acid, succinic anhydride, fumaric acid, adipic acid, sebacic acid, azelaic acid, dimeric fatty acids, trimeric fatty acids, trimellitic acid, trimellitic anhydride, pyromellitic acid, pyromellitic anhydride and mixtures of these or other acids.

Suitable monohydric alcohols are, for example, n-hexanol, cyclohexanol, decanol, dodecanol, tetradecanol, octanol, octadecanol, natural and synthetic fatty alcohols, such as for example lauryl alcohol, Ocenol 110/130 (Henkel) and mixtures of these and other alcohols. The monohydroxy-functional alcohols may also be provided with carboxyl functions. Suitable examples are dimethylolpropionic acid, lactic acid, malic acid, tartaric acid, ε-hydroxycaproic acid, castor oil fatty acid or ε-caprolactone.

Suitable polyhydric alcohols are, for example, ethylene glycol, 1,2- and 1,3-propylene glycol, 1,3-, 1,4-, 2,3-butanediol, 1,6-hexanediol, 2,5-hexanediol, trimethylhexanediol, diethylene glycol, triethylene glycol, hydrogenated bisphenols, 1,4-cyclohexanediol, 1,4-cyclohexanedimethanol, neopentyl glycol, tricyclodecanediol, 1,4-butanediol, trimethylolpropane, glycerol, pentaerythritol, trimethylpentanediol, dipentaerythritol and mixtures of these or other polyhydric alcohols.

Monoaminohydroxy and/or monoaminocarboxy compounds are also suitable. Examples of these are aminoethanol, 2-amino-propanol, diethanolamine, aminoacetic acid or 6-amino-hexanoic acid.

Suitable organic solvents for production of the polyester resin are, for example, N-methylpyrrolidone, methyl ethyl ketone, methyl isobutyl ketone, acetone, xylene, butyl acetate or mixtures of these or other solvents.

Polyester-modified (meth)acrylic copolymers may also be used as binder component A). These binders are produced by free-radical copolymerisation in the presence of a polyester resin. Polyesters which may be used are, for example, those as have been described above as binder component A). Monomers which may be used for the copolymerisation are, for example, those as have been described above for the production of the (meth)acrylic copolymers usable as component A). The nature and quantity of the monomers are here selected such that the desired specifications with regard to molecular weight, OH group ratio, OH value and acid value are achieved.

Production proceeds, for example, as free-radical solution polymerisation in the presence of a free-radical initiator, as have already been described above for the production of the (meth)acrylic copolymers according to the invention. The polymerisation initiators are generally used, for example, in a quantity of 0.1 to 4 wt. %, relative to the initial weight of monomers. During polymerisation, the monomers may also be apportioned separately or at different times. For example, the entirety or a proportion of the polyester resin, optionally dissolved in an organic solvent, is initially introduced and free-radical polymerisation is then performed by grafting onto this polyester resin or polyester resin solution. Solvents which may be used are those which are also used during synthesis of the polyester resin, but other suitable solvents may also be used. Suitable organic solvents are conventional lacquer solvents as may subsequently also be used in the coating composition according to the invention, for example: glycol ethers, such as ethylene glycol dimethyl ether; glycol ether esters, such as ethylene glycol monoethyl ether acetate, ethylene glycol monobutyl ether acetate, 3-methoxy-n-butyl acetate, diethylene glycol monobutyl ether acetate, methoxypropyl acetate, esters, such as butyl acetate, isobutyl acetate, amyl acetate; ketones, such as methyl ethyl ketone, methyl isobutyl ketone, diisobutyl ketone, cyclohexanone, isophorone; aromatic hydrocarbons, such as xylene, Solvesso 100 (registered trademark for a mixture of aromatic hydrocarbons having a boiling range of 155 to 185° C.) and aliphatic hydrocarbons may also be used blended with the above-stated solvents. The polyalkylene glycol dialkyl ethers usable as component C) in the coating compositions according to the invention are particularly preferred, for example polyethylene glycol di-n-butyl ether, which may constitute at least a proportion of the solvents. Chain-transfer agents may be used in this case too to control molecular weight.

Examples of polyurethane polyols of the above-defined component A) are obtained from the reaction of polyisocyanates, such as di- and/or higher polyisocyanates, with an excess of polyols, such as di- and/or higher polyols. Suitable di- and/or other polyols are those as have already been listed in the description of the polyesters. Examples of suitable di- and/or other polyisocyanates are cycloaliphatic and aliphatic polyisocyanates, such as 1,2-propylene diisocyanate, 2,3-butylene diisocyanate, tetramethylene diisocyanate, 1,6-hexamethylene diisocyanate, 2,2,4-trimethylene diisocyanate, 1,12-dodecane diisocyanate, 1,3- and 1,4-cyclohexane diisocyanate, 1-isocyanato-3,3,5-trimethyl-5-isocyanatomethylcyclohexane (=isophorone diisocyanate, IPDI) or mixtures of these compounds.

In addition to these simple isocyanates, those containing heteroatoms in the isocyanate group linking residue are also suitable. Examples of these are polyisocyanates containing carbodiimide groups, allophanate groups, isocyanurate groups, urethane groups, acylated urea groups and biuret groups.

Particularly suitable for the invention are, for example, modification products of the above-stated simple polyisocyanates containing biuret, isocyanurate or urethane groups, in particular tris-(6-isocyanatohexyl)biuret, or low molecular weight polyisocyanates containing urethane groups, as may be obtained by reacting excess IPDI with polyhydric alcohols of the molecular weight range from 62 to 300, in particular with trimethylolpropane. Any desired mixtures of the stated polyisocyanates may, of course, also be used for the production of the products usable according to the invention.

Suitable polyisocyanates are moreover known prepolymers having terminal isocyanate groups, as are in particular obtainable by reacting the above-stated simple polyisocyanates, especially diisocyanates, with substoichiometric quantities of organic compounds having at least two groups capable of reacting with isocyanate groups. Those used are preferably those having a total of at least two amino groups and/or hydroxyl groups and a number average molecular weight of 300 to 10000, preferably of 400 to 6000. The corresponding polyhydroxyl compounds are preferably used, for example the hydroxy polyesters, hydroxy polyethers and/or acrylate resins containing hydroxyl groups known in polyurethane chemistry.

In these known prepolymers, the ratio of isocyanate groups to NCO-reactive hydrogen atoms is 1.05 to 10:1, preferably 1.1 to 3:1, wherein the hydrogen atoms preferably originate from hydroxyl groups. The nature and quantity ratios of the starting materials used in the production of the NCO prepolymers are moreover preferably selected such that the NCO prepolymers have a) an average NCO functionality of 2 to 4, preferably of 2 to 3 and b) a number average molecular weight of 500 to 10000, preferably of 800 to 4000.

It is also possible to use copolymers of the vinylically unsaturated monoisocyanate dimethyl-m-isopropenylbenzyl isocyanate, as is described inter alia in DE-A-41 37 615.

Component A) may contain no solvents or may still contain solvent residues from the production thereof.

The aqueous coating compositions according to the invention may be used for various applications. If they are to be used, for example, as aqueous surfacer compositions, binder systems (polyol components A) suitable for aqueous surfacers are those as are described in DE-A-38 05 629, DE-A-39 36 288, DE-A-40 00 748, DE-A-41 42 734 or DE-A-41 42 816. These are binders based on polyurethanes, polyesters and/or polyesterurethanes which contain OH groups and additionally COOH groups. Partial neutralisation of the COOH groups may be exploited in order to convert the compounds into water phase. These anionic binders preferably have acid values of 10 to 100 mg of KOH/g. The OH values are preferably of the order of 20 to 250 mg of KOH/g.

The coating compositions according to the invention contain, for example, aminoplastic resins, phenolic resins and/or polyisocyanates, which may be free and/or capped, as the crosslinking component B).

The aminoplastic resin crosslinking agents, which are also referred to below as amino resin crosslinking agents, may be resins conventionally used in the lacquer sector as crosslinking agents. Suitable aminoplastic resins include, for example, alkylated condensation products which are produced by reacting aminotriazines and amidotriazines with aldehydes. These condensation products are produced using known industrial processes by condensing compounds bearing amino or amido groups such as melamine, benzoguanamine, dicyandiamide, urea, N,N'-ethyleneurea with aldehydes, in particular formaldehyde, in the presence of alcohols, such as methyl, ethyl, propyl, isobutyl, n-butyl and hexyl alcohol. The reactivity of such amino resins is determined by the degree of condensation, the ratio of the amine or amide component to the aldehyde and by the nature of the etherification alcohol used.

The aminoplastic resins may be water-dilutable or non-water-dilutable. Examples of non-water-dilutable amino resin crosslinking agents are water-insoluble or sparingly water-soluble butanol- or isobutanol-etherified melamine resins, such as, for example, the commercial products Setamin® US 138 or Maprenal® FM 610, co-etherified melamine resins, which are etherified by both butanol and methanol, such as, for example, Cymel® 254, together with hexamethyl-oxymethylmelamine resins, such as, for example, Cymel® 301 or Cymel® 303, wherein the latter may require an external acid catalyst, such as, for example, p-toluenesulphonic acid, for crosslinking.

Examples of water-dilutable amino resin crosslinking agents are conventional hydrophilic and thus water-soluble or water-compatible melamine resins, such as, for example, methyl-etherified melamine resins, such as, for example, Cymel® 325, Cymel® 327, Cymel® 350, Cymel® 370, Maprenal® MF 927.

Examples of other suitable crosslinking agents are phenolic resins, such as reaction products of phenol or substituted phenols with various aldehydes in a molar excess in the presence of alkaline catalysts (resol type). Examples of phenolic compounds are phenol, cresol, xylenol, resorcinol and substituted phenols, such as p-tert.-butylphenol, p-tert.-amylphenol, p-phenylphenol, isothymol, cardanol or also polycyclic phenols, such as dihydroxydiphenylpropane (bisphenol A) or dihydroxydiphenylmethane (bisphenol F). Another suitable starting material comprises phenolic novolak resins which are optionally defunctionalised with monocarboxylic acids, preferably α-branched monocarboxylic acids, monophenols, which are in particular substituted with $C_1$–$C_{18}$ alkyl groups, or also monoepoxides, such as α-monoepoxyalkanes, monoglyceride ethers, or monoglyceride esters. The aldehydes used are formaldehyde and the polymerisation products thereof, such as paraformaldehyde, trioxymethylene, polyformaldehyde or also hexamethylene-tetramine. Acetaldehyde, paraldehyde and metaldehyde, together with butyraldehyde or furfural are highly suitable. The methylol groups are partially or preferably completely etherified with methanol, ethanol, propanol and/or butanol.

The coating compositions according to the invention may contain free and/or capped polyisocyanates. Examples of isocyanates which may be used are those listed in the description of the polyurethane resins. The isocyanate groups of the polyisocyanates used may be free, partially or completely capped. Conventional capping agents may be used, for example 1,2-propanediol, malonic acid dimethyl ester, malonic acid diethyl ester, acetoacetic acid ethyl ester and/or butanone oxime together with other capping agents familiar to the person skilled in the art. Further capping agents which may be considered are, for example, compounds which contain only one single amine, amide, imide, lactam, thio or hydroxyl group. Examples are aliphatic or cycloaliphatic alcohols, such as n-butanol, isopropanol, tert.-butanol, furfurol, 2-ethylhexanol, cyclohexanol, phenols, cresol, tert.-butylphenols, dialkylamino alcohols, such as dimethylaminoethanol, oximes, such as methyl ethyl ketoxime, acetone oxime, cyclohexanone oxime, acetophenone oxime, lactams such as ε-caprolactam or 2-pyrrolidone, imides, such as phthalimide or N-hydroxymaleimide, hydroxyalkyl esters, hydroxamic acids and the esters thereof, N-alkylamides such as methylacetamide, imidazoles such as 2-methylimidazole, pyrazoles such as 2,3-dimethylpyrazole. Mixtures of these capping agents may, however, also be used.

The polyalkylene glycol dialkyl ethers used according to the invention as component C) constitute an essential feature of the invention. Use of these solvents has a decisive, positive effect on pinholing resistance, tendency to sag and storage stability.

The coating composition according to the invention is in water-borne form. If an aqueous emulsion is to be prepared, the solvent used in the production of component A) is largely removed. This may be achieved by distillation, optionally under a vacuum. The resultant resin concentrate, which has an elevated solids content of, for example, up to 90 wt. % or above, may then be neutralised by means of the acid groups of component A) with a conventional base, for example ammonia or an organic amine, for example, triethylamine; it is then mixed with a sufficiently small quantity of water that phase inversion does not occur. The neutralised component A) resin concentrate then acts as an emulsifier resin. Component B), the solvent polyalkylene glycol dialkyl ether and further lacquer additives may be then incorporated into this emulsifier resin, which is a water-in-oil emulsion. Subsequently, once further water has been added, for example with vigorous stirring and, if necessary, heating, for example to temperatures of 30 to 95° C., for example 50° C., the oil-in-water emulsion is produced by phase inversion.

1 to 20 wt. % of the emulsified organic resin solution consists of polyalkylene glycol dialkyl ethers.

Once prepared, the resin concentrate A) may also be emulsified with crosslinking agents, lacquer additives and the solvent polyalkylene glycol dialkyl ether using conventional ionic or nonionic emulsifiers. This is achieved, for example, by homogenising the resin concentrate and the nonionic emulsifier, optionally with 10 heating, for example to temperatures of 30 to 80° C., for example 60° C. Such a mixture may be emulsified continuously or batch-wise in a conventional homogenisation apparatus. Examples of these are rotor/stator homogenisers which operate at rotational speeds of, for example, 8000 to 10000 revolutions per minute. The emulsifiers are used, for example, in quantities of 3 to 30 wt. %, relative to the resin concentrate.

The binder compositions according to the invention may be formulated in the conventional manner to produce aqueous coating compositions. This generally proceeds by adding solvents or water in order to establish the required application viscosity.

Suitable organic solvents for the production of aqueous coating compositions, for example lacquers, are those which may also be used in the production of the individual components. Examples of such solvents are organic solvents, such as aliphatic and aromatic hydrocarbons, for example toluene, xylene, mixtures of aliphatic and/or aromatic hydrocarbons, esters, ethers and in particular polyalkylene glycol dialkyl ethers, for example polyethylene glycol di-n-butyl ether.

Conventional additives, as are, for example, usual in the lacquer sector, may be added in order to produce the aqueous coating compositions. Examples of such additives are pigments, for example transparent or opaque colouring pigments such as titanium dioxide or carbon black and effect pigments, such as metal flake pigments and/or pearlescent pigments.

Further examples of additives are extenders, such as, for example, talcum and silicates; plasticisers, light stabilisers, stabilisers and levelling agents, such as silicone oils. The coating compositions according to the invention may be adjusted to the desired application viscosity by appropriately controlling the addition of solvents and/or water and/or additives. The coatings produced from the aqueous coating compositions may be cured within a wide range of temperatures of, for example, 20° C. to 180° C., preferably in the range between 80° C. and 150° C.

The aqueous coating compositions according to the invention are suitable for coatings which adhere to numerous substrates, such as, for example, wood, textiles, plastics, glass, ceramics, plaster, cement and in particular metal. The aqueous coating compositions may also be used in multi-layer coating applications. They may thus, for example, be applied onto conventional primers, base lacquers, surfacers or existing topcoat lacquers.

A particularly preferred field of application for the coating compositions according to the invention is the provision of aqueous coating compositions for lacquer coatings which are intended to have elevated pinholing resistance simultaneously combined with very good sag resistance.

The present invention accordingly also relates to processes for the production of coatings on various substrates, in which processes a coating composition according to the invention is applied onto the substrate, whereupon it is dried and cured. The invention also relates to the use of the coating compositions according to the invention as aqueous surfacers, water-borne base lacquers, water-borne topcoat lacquers or water-borne clear lacquers.

In every instance, the films obtained with the coating compositions according to the invention have very good resistance to chemicals, very good sag resistance, very good pinholing resistance and good topcoat lacquer qualities at a very high processing solids content.

The coating compositions according to the invention may be applied in the conventional manner, for example by dipping, spraying, brushing or by electrostatic methods.

The following Examples illustrate the invention.

EXAMPLE 1

Production of a polyester 1643.5 g of isononanoic acid, 1150.1 g of pentaerythritol, 1202.5 g of hexahydrophthalic anhydride were esterified with 4 g of hypophosphorous acid to an acid value of 25 mg of KOH/g as a melt at 180 to 220° C. in a 6 liter, three-necked flask equipped with a stirrer, separator, thermometer and reflux condenser. The resultant polyester has a stoving residue of 98.1% (1 h, 150° C.), a hydroxyl value of 146 mg of KOH/g at an acid value of 26.7 mg of KOH/g.

EXAMPLE 2

Production of a polyester acrylate resin
600 g of Polyglycol BB-300
960 g of polyester from Example 1
513 g of versatic acid glycidyl ester (trade name of Shell AG, Cardura E10)
were initially introduced into a 4 liter, four-necked flask equipped with a stirrer, reflux condenser, dropping funnel and thermometer and heated to 148° C. while being stirred.
A mixture of
72 g of lauryl acrylate
371 g of styrene
58 g of isobutyl acrylate
202 g of acrylic acid
189 g of hydroxyethyl acrylate
9 g of di-tert.-butyl peroxide
26 g of tert.-butyl peroxy-2-ethylhexanoate
is then apportioned within a period of 5 hours. The mixture is then post-polymerised at 148° C. for a further 5 hours. The resin has a stoving residue of 79.4% (1 h, 150° C.), an acid value of 30.5 mg of KOH/g and an OH value of 144 mg of KOH/g.

EXAMPLE 3

Production of an aqueous polyester acrylate emulsion 2445.0 g of the polyester acrylate resin described in Example 2 are heated to 60° C. while being stirred in a 6 liter, three-necked flask equipped with a stirrer, thermometer and dropping funnel. The mixture is then neutralised by adding 47.1 g of dimethylethanolamine. 1289.0 g of deionised water heated to 60° C. are then apportioned within 30 minutes with stirring. The resultant emulsion then has a stoving residue of 50.9% (1 h, 150° C.) and a pH value of 8.5 (10% in deionised water).

EXAMPLE 4

Production of a polyester acrylate resin
600 g of diethylene glycol monobutyl ether
960 g of polyester from Example 1
513 g of versatic acid glycidyl ester
were initially introduced into a 4 liter, four-necked flask equipped with a stirrer, reflux condenser, dropping funnel and thermometer and heated to 148° C. while being stirred.
A mixture of
72 g of lauryl acrylate
371 g of styrene
58 g of isobutyl acrylate
202 g of acrylic acid
189 g of hydroxyethyl acrylate
9 g of di-tert.-butyl peroxide
26 g of tert.-butyl peroxy-2-ethylhexanoate
is then apportioned within a period of 5 hours. The mixture is then post-polymerised at 148° C. for a further 5 hours. The resin has a stoving residue of 83.3% (1 h, 150° C.), an acid value of 26.4 mg of KOH/g and an OH value of 144 mg of KOH/g.

EXAMPLE 5

Production of a polyester acrylate emulsion 2750.0 g of the polyester acrylate resin described in Example 4 were heated to 60° C. while being stirred in a 6 liter, three-necked flask equipped with a stirrer, thermometer and dropping funnel. The mixture is then neutralised by adding 48.0 g of dimethylethanolamine. 1068.0 g of deionised water heated to 60° C. were then apportioned within 30 minutes with stirring. The resultant emulsion then has a stoving residue of 59.2% (1 h, 120° C.) and a pH value of 8.2 (10% in deionised water).

EXAMPLE 6

Production of a polyester acrylate resin
600 g of dipropylene glycol dimethyl ether (trade name Dow: Proglyde DMM)
960 g of polyester from Example 1
513 g of versatic acid glycidyl ester
were initially introduced into a 4 liter, four-necked flask equipped with a stirrer, reflux condenser, dropping funnel and thermometer and heated to 148° C. while being stirred.
A mixture of
72 g of lauryl acrylate
371 g of styrene
58 g of isobutyl acrylate
202 g of acrylic acid
189 g of hydroxyethyl acrylate
9 g of di-tert.-butyl peroxide
26 g of tert.-butyl peroxy-2-ethylhexanoate
is then apportioned within a period of 5 hours. The mixture is then post-polymerised at 148° C. for a further 5 hours. The resin has a stoving residue of 80.3% (1 h, 150° C.), an acid value of 28.4 mg of KOH/g and an OH value of 144 mg of KOH/g.

EXAMPLE 7

Production of a polyester acrylate emulsion 2853.0 g of the polyester acrylate resin described in Example 6 are heated to 60° C. while being stirred in a 6 liter, three-necked flask equipped with a stirrer, thermometer and dropping funnel. The mixture is then neutralised by adding 51.6 g of dimethylethanolamine. 978.0 g of deionised water heated to 60° C. are then apportioned within 30 minutes with stirring. The resultant emulsion then has a stoving residue of 59.0% (1 h, 120° C.) and a pH value of 8.0 (10% in deionised water).

EXAMPLE 8

| Water-borne lacquers from | Invention | Comparisons | |
|---|---|---|---|
| Examples 3, 5, 7 | I | II | III |
| Polyester acrylate emulsion from Example 3 | 50.30 | — | — |
| Polyester acrylate emulsion from Example 5 | — | 46.50 | — |
| Polyester acrylate emulsion from Example 7 | — | — | 46.70 |
| Melamine resin | 14.40 | 15.50 | 15.50 |
| Light stabiliser | 0.87 | 0.93 | 0.93 |
| Levelling agent | 0.18 | 0.19 | 0.19 |
| Amine-blocked acid catalyst | 1.20 | 1.29 | 1.29 |
| Deionised water | 13.30 | 14.32 | 14.12 |

-continued

| Water-borne lacquers from | Invention | Comparisons | |
|---|---|---|---|
| Examples 3, 5, 7 | I | II | III |
| Dimethylethanolamine (10% in deionised water) | 5.10 | 5.48 | 5.48 |
| Deionised water | 14.65 | 15.79 | 15.79 |
| | 100.00 | 100.00 | 100.00 |

The water-borne lacquers I, II and III are adjusted to a spraying viscosity of 30 sec. $AK_4/25°$ C. with deionised water and applied using the conventional wet-on-wet process onto a water-borne base lacquer.

| Lacquer results | I | II | III |
|---|---|---|---|
| Pinholing limit, μm | 66 | 50 | 40 |
| Sag tendency, μm | 45 | 30 | 40 |
| Storage stability | OK | Not OK | OK |
| Topcoat qualities | OK | Not OK | OK |

We claim:

1. Aqueous coating composition which contains binders based on water-dilutable polyol compounds or cross-linking agents comprising at least one member selected from the group consisting of hydroxy-functional poly(meth)acrylates, polyurethanes, polyethers, polyesters, polyester-modified poly(meth)acrylates, aminoplastic resins, phenolic resins and free or capped polyisocyanates, wherein said composition comprises one or more poly($C_2$–$C_3$)alkylene glycol di($c_1$–$C_4$) alkyl ethers.

2. Coating composition according to claim 1, comprising 1 to 20 wt. % of poly($C_2$–$C_3$)alkylene glycol di($C_1$–$C_4$)alkyl ethers, relative to the sum of weights of the binders and poly($C_2$–$C_3$)alkylene glycol di($C_1$–$C_4$)alkyl ethers.

3. Coating composition according to claim 1, in which the poly($C_2$–$C_3$)alkylene glycol di($C_1$–$C_4$)alkyl ether comprises 3 to 10 units derived from $C_2$ and/or $C_3$ alkylene glycols.

4. Coating composition according to claim 1, in which the etherification alcohols of the poly($C_2$–$C_3$)alkylene glycol di($C_1$–$C_4$)alkyl ethers comprise alcohols having 1 to 4 carbon atoms.

5. Coating composition according to claim 4, in which the poly($C_2$–$C_3$)alkylene glycol di($C_1$–$C_4$)alkyl ethers comprise poly($C_2$–$C_3$)alkylene glycol di-n-butyl ethers.

6. Coating composition according to claim 1, in which the poly($C_2$–$C_3$)alkylene glycol di($C_1$–$C_4$)alkyl ether comprises a polyethylene glycol di-n-butyl ether.

7. Coating composition according to claim 1, comprising:
   A) 40 to 90 wt. % of one or more binders based on one or more water-dilutable oligomeric or polymeric polyol compounds in the form of hydroxy-functional poly(meth)acrylates, polyurethanes, polyethers, polyesters and/or polyester-modified poly(meth)acrylates having a hydroxyl value of 20 to 300 mg of KOH/g, an acid value of 0 to 100 mg of KOH/g, a number average molecular weight of 500 to 10000 and a glass transition temperature of −20 to +70° C.;
   B) 10 to 60 wt. % of one or more aminoplastic resins, phenolic resins and/or free and/or capped polyisocyanates;
   C) 1 to 20 wt. % of poly($C_2$–$C_3$)alkylene glycol di($C_1$–$C_4$) alkyl ethers
   optionally together with one or more organic solvents and further conventional lacquer additives,
   wherein the sum of components A) to C) is in each case 100 wt. %.

8. Process for the multi-layer lacquer coating of substrates by applying a priming layer, optionally together with a surfacer layer, onto which a topcoat lacquer layer, which may consist of a base lacquer layer and clear lacquer layer, is applied, comprising: applying a coating composition according to claim 1 to produce the surfacer layer, topcoat lacquer layer, base lacquer layer or clear lacquer layer.

9. Process according to claim 8, comprising forming a topcoat lacquer layer or clear lacquer layer.

10. Process according to claim 8, further comprising stoving within a temperature range from 80 to 150° C.

11. Process comprising applying an aqueous coating composition according to claim 1 for multi-layer lacquer coating of substrates.

12. Process comprising applying a coating composition according to claim 1 for lacquer coating of vehicles or components thereof.

13. Process for using poly ($C_2$–$C_3$) alkylene glycol di ($C_1$–$C_4$) alkyl ethers as an additive to aqueous coating compositions based on water-dilutable polyol compounds or cross-linking agents comprising at least one member selected from the group consisting of hydroxy-functional poly(meth)acrylates, polyurethanes, polyethers, polyesters, polyester-modified poly(meth)acrylates, aminoplastic resins, phenolic resins and free or capped polyisocyanates.

14. A process for using polyethylene glycol di-n-butyl ether as an additive to aqueous coating compositions based on water-dilutable polyol compounds or cross-linking agents comprising at least one member selected from the group consisting of hydroxy-functional poly(meth)acrylates, polyurethanes, polyethers, polyesters, polyester-modified poly(meth)acrylates, aminoplastic resins, phenolic resins and free or capped polyisocyanates.

* * * * *